United States Patent
Huang et al.

(10) Patent No.: US 12,106,564 B2
(45) Date of Patent: Oct. 1, 2024

(54) SYSTEM AND METHOD FOR DETECTING AND CORRECTING CYCLE TIME

(71) Applicants: Inventec (Pudong) Technology Corporation, Shanghai (CN); INVENTEC CORPORATION, Taipei (TW)

(72) Inventors: Jing-Lun Huang, Taipei (TW); Yu-Lun Chang, Taipei (TW); Wei-Chao Chen, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 64 days.

(21) Appl. No.: 18/107,592

(22) Filed: Feb. 9, 2023

(65) Prior Publication Data
US 2024/0161502 A1 May 16, 2024

(30) Foreign Application Priority Data
Nov. 11, 2022 (CN) .......................... 202211410558.8

(51) Int. Cl.
*G06V 20/40* (2022.01)
*G06T 5/10* (2006.01)
*G06V 10/25* (2022.01)
*G06V 20/70* (2022.01)

(52) U.S. Cl.
CPC ................ *G06V 20/44* (2022.01); *G06T 5/10* (2013.01); *G06V 10/25* (2022.01); *G06V 20/70* (2022.01); *G06T 2207/20084* (2013.01); *G06T 2207/20132* (2013.01)

(58) Field of Classification Search
CPC ........... H04N 21/42203; H04N 21/472; H04N 21/43635; H04N 21/44204; H04N 21/6543; H04N 21/814; H04R 1/08; H04R 3/00
See application file for complete search history.

(56) References Cited

U.S. PATENT DOCUMENTS

| | | | |
|---|---|---|---|
| 2021/0133930 A1* | 5/2021 | Dinh | G06T 7/0008 |
| 2024/0160194 A1* | 5/2024 | Bakhshmand | G06N 3/047 |

* cited by examiner

*Primary Examiner* — Michael Lee
(74) *Attorney, Agent, or Firm* — Locke Lord LLP; Tim Tingkang Xia, Esq.

(57) ABSTRACT

A method for detecting and correcting cycle time includes multiple steps performed by a computing device, and these steps include: obtaining a video from a camera, obtaining a bounding box from an input device, inputting the bounding box and the video to a cycle time detection model to generate a preliminary report, wherein the bounding box is used to set a region of interest in the video, the preliminary report includes a plurality of candidate events, and each candidate event includes a start time and a candidate cycle time, receiving a revision label associated with at least one candidate event from the input device, and tuning a hyperparameter of the cycle time detection model according to the revision label.

8 Claims, 3 Drawing Sheets

SYSTEM AND METHOD FOR DETECTING AND CORRECTING CYCLE TIME

CROSS-REFERENCE TO RELATED APPLICATIONS

This non-provisional application claims priority under 35 U.S.C. § 119(a) on Patent Application No(s). 202211410558.8 filed in China on Nov. 11, 2022, the entire contents of which are hereby incorporated by reference.

BACKGROUND

1. Technical Field

The present disclosure relates to image processing and artificial intelligence, and more particular to a system and method for detecting and correcting cycle time based on a video.

2. Related Art

Manufacturing cycle time is defined as the time cost of a specific step in the production process. In real applications, the administrator usually computes average cycle time by counting the number of complete cycles of that specific step in a period of time. The cycle time is a crucial performance metric in manufacturing. More precisely, it is an indicator of production efficiency. For example, cycle time can be used in manufacturing efficiency improvement planning. Producing a unit of product need a lot of steps. The administrator is interested in the time cost of each step. Based on cycle time, the administrator can infer the efficiency of each step and decide whether to improve the efficiency of that step. Therefore, cycle time can be used in manufacturing efficiency improvement planning.

There are two common methods to measure cycle time, manual measurement and sensor measurement. Manual measurement means that the cycle time is measured by human. That is, one worker starts a timer, watches another worker's operations, and computes the cycle time. However, manual measurement results in inefficiency and bias. First, measuring cycle time takes workers' time for standing there and counting, which burdens an opportunity cost and causes inefficiency. Second, the productivity of a person under different scenarios may vary, which is also known as observer bias. Therefore, manual measurement may be a biased estimation.

Sensor measurement means that the cycles are detected by sensors. That is, sensors detect whether an item is passing here and record the event time. However, sensor measurement has its disadvantages. First, sensors are expensive. Second, the sensor measurement detects only simple and specific events. Moreover, people need different sensors for detecting different events, so the cost of sensors may be heavy as time goes on.

SUMMARY

In view of the above, the present disclosure proposes a system and method for detecting and correcting cycle time to solve problems described above.

According to an embodiment of the present disclosure, a method for detecting and correcting cycle time, performed by a computing device, includes the following steps: obtaining a video from a camera; obtaining a bounding box from an input device and inputting the bounding box and the video to a cycle time detection model to generate a preliminary report, wherein the bounding box is used to set a region of interest in the video, the preliminary report comprises a plurality of candidate events, and each of the plurality of candidate events includes a start time and a candidate cycle time; receiving a revision label associated with at least one of the plurality of candidate events from the input device; and tuning a hyper-parameter of the cycle time detection model according to the revision label.

According to an embodiment of the present disclosure, a system for detecting and correcting cycle time includes a camera, an input device, and a computing device. The camera captures an environment to generate a video. The input device receives a bounding box and a revision label, wherein the bounding box is used to set a region of interest in the video. The computing device is communicably connected to the camera and the input device, wherein the computing device is configured to input the bounding box and the video to a cycle time detection model to generate a preliminary report, the preliminary report comprises a plurality of candidate events, each of the plurality of candidate events includes a start time and a candidate cycle time, the computing device is further configured to tune a hyper-parameter of the cycle time detection model according to the revision label, wherein the revision label is associated with at least one of the plurality of candidate events.

In view of the above, the present disclosure proposed a system and a method for detecting and correcting cycle time based on video, which has advantages such as automation, flexibility, and continuously tuning.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
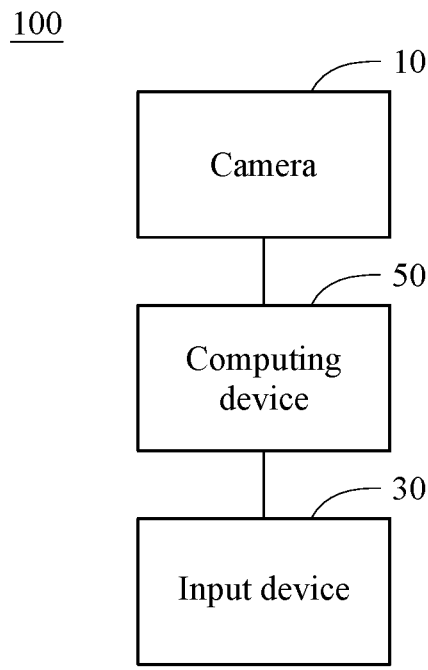
FIG. 1 is a block diagram of the system for detecting and correcting cycle time according to an embodiment of the present disclosure.

FIG. 1 is a block diagram of the system for detecting and correcting cycle time according to an embodiment of the present disclosure. As shown in FIG. 1, the system 100 for detecting and correcting cycle time includes a camera 10, an input device 30, and a computing device 50, where the computing device 50 is communicably connected to the camera 10 and the input device 30.

The camera 10 captures an environment to generate a video. There is a periodic event in the environment, for example, a worker assembles units on the production line.

The input device 30 receives an operation of the user, sets a bounding box as a region of interest in the video and receives a revision label. In an embodiment, the input device 30 is further configured to receive an event threshold, an upper bound and a lower bound. In another embodiment, the input device 30 is further configured to receive a period hint. For revision label, upper bound, lower bound and period hint, please refer to the description below.

In an embodiment, the input device 30 may be implemented by one or more of the following examples: keyboard, mouse, touch screen, button or any device with similar functions. The present disclosure does not limit the hardware type of the input device 30.

The computing device 50 is configured to input the bounding box and the video to a cycle time detection model to generate a preliminary report. The preliminary includes a plurality of candidate events, and each candidate event includes a start time and a candidate cycle time. The computing device 50 is further configured to tune a hyper-parameter of the cycle time detection model according to the revision label, where the revision label is associated with at least one of the plurality of candidate events.

In an embodiment, the computing device 50 may be implemented by one or more of the following examples: microcontroller (MCU), application processor (AP), field programmable gate array (FPGA), application specific integrated circuit (ASIC), system-on-a-chip (SOC), deep learning accelerator, or any electronic device with similar function. The present disclosure does not limit the type of hardware of the computing device 50.

Figure 2:
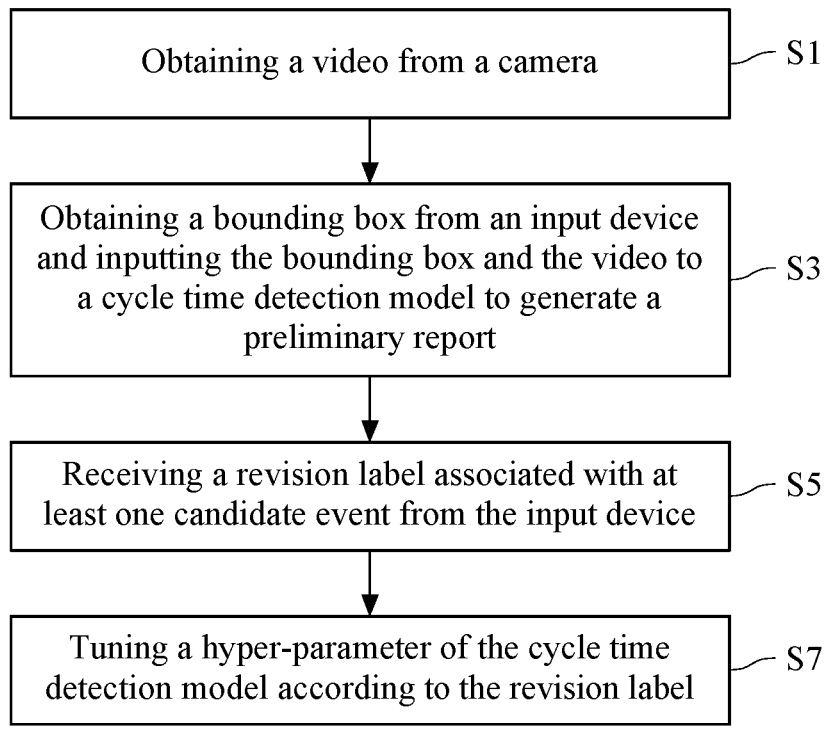
FIG. 2 is a flowchart of the method for detecting and correcting cycle time according to an embodiment of the present disclosure.

In overall, the present disclosure is based on the repeatability of the video. In the video with periodic events, many frames are repeated, and the system 100 for detecting and correcting cycle time designed by the present disclosure may achieve the goal of detecting periodic event. The operations of this system 100 contains 4 stages: data exchange, artificial intelligence (AI) inference, report generation, and hyper-parameter tuning. The following describes the operations of the system 100 for detecting and correcting cycle time. Please refer to FIG. 2, which is a flowchart of the method for detecting and correcting cycle time according to an embodiment of the present disclosure and includes steps S1, S3, S5 and S7.

In step S1, the computing device 50 obtains a video from the camera 10. Step S1 belongs the aforementioned stage of data exchange.

In an embodiment, the system 100 for detecting and correcting cycle time proposed by the present disclosure further includes a user interface. The user interface is, for example, in a form of the webpage that allows the user to set a station name, a station address and model parameters. The station represents the position where the camera 10 is disposed, the station address is, for example, the internet protocol (IP) address of the camera 10, which ensures that the system 100 can stream videos by real time streaming protocol (RTSP) or hypertext transfer protocol (HTTP). The computing device 50 further stores a station list, which records the information filled in by the user through the user interface. Users may also view the station list and add or delete stations to the station list. Once a station is added, the computing device 50 assigns a station ID to the new station for identification The user may setup parameters required in the second stage (AI inference) through the user interface, such as setting the region of interest (ROI) in the video and a period hint. Users may crop the video to a ROI to ignore unrelated information and may set period hint as a parameter for guiding the AI model to focus on some specific cycles in the video.

In step S3, the computing device 50 obtains the bounding box from the input device 30, and inputs the bounding box and the video to a cycle time detection model to generate a preliminary report.

Figure 3:
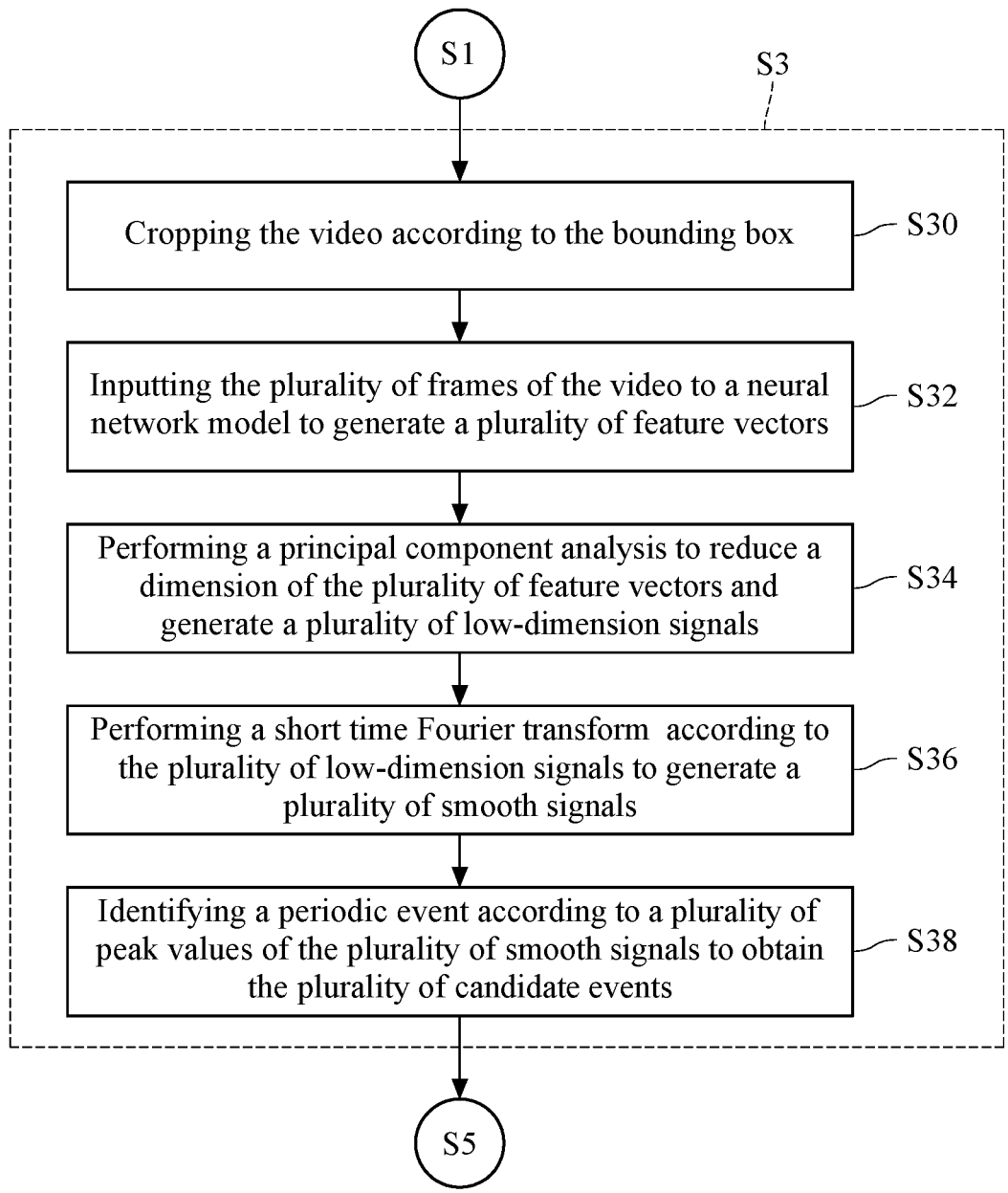
FIG. 3 is a detail flowchart of a step in FIG. 2.

The step S3 includes aforementioned stages of AI inference and report generation. In this stage, the system 100 to stream the frames and detect cycles based on the AI model. FIG. 3 is a detail flowchart of a step in FIG. 2 and includes steps S30, S32, S34, S36, and S38. Specifically, in step S30, the computing device 50 crops the video according to the bounding box. In step S32, the computing device 50 inputs the plurality of frames of the video to a neural network model to generate a plurality of feature vectors. In step S34, the computing device 50 performs a principal component analysis to reduce a dimension of the plurality of feature vectors and generate a plurality of low-dimension signals. In step S36, the computing device 50 performs a short time Fourier transform (STFT) according to the plurality of low-dimension signals to generate a plurality of smooth signals. In step S38, the computing device 50 identifies a periodic event according to a plurality of peak values of the plurality of smooth signals to obtain the plurality of candidate events.

In an embodiment, the computing device 50 starts a thread to stream the frames and stores frames in a buffer, and starts another thread to get frames from the buffer, computes the AI inference results, and stores the results.

In an embodiment, the method of reducing the dimension of feature vectors is to projects the vectors into one-dimension space.

In an embodiment, before performing the STFT according to the plurality of low-dimension signals to generate the plurality of smooth signals, the computing device 50 sets a sliding window size of the STFT according to the period hint. For example, the period hint may be set to 65 seconds.

In an embodiment, the computing device 50 filters the peak values within the smooth signals according to an event threshold to remove the noise, that is, preserve preserving events with higher peak prominence than the event threshold as the candidate event.

Figure 4:
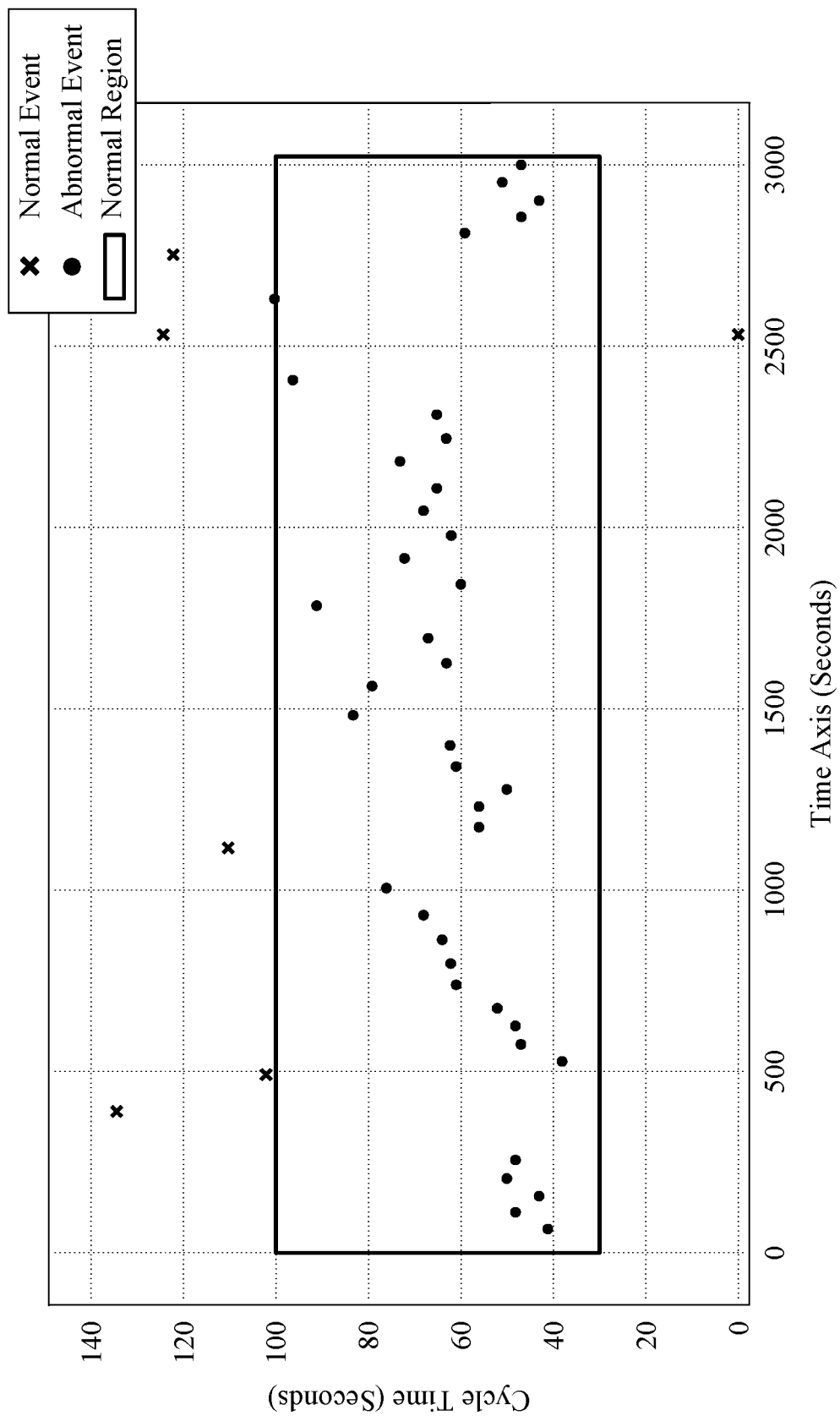
FIG. 4 is an example of the cycle distribution diagram in the preliminary report.

In the stage of report generation, the system 100 shows the table and the diagram through the user interface for users to view. An example of the table is shown below, and an example of the diagram is shown in FIG. 4.

TABLE 1 the example of table in the preliminary report.

| Event time | Cycle time (second) | AI label | Revision label | Description |
|---|---|---|---|---|
| 0:00:24 | NaN | NaN | (None) | (None) |
| 0:01:04 | 41 | Normal | (None) | (None) |
| 0:01:53 | 48 | Normal | (None) | (None) |
| 0:02:36 | 43 | Normal | (None) | (None) |
| 0:03:25 | 50 | Normal | (None) | (None) |
| 0:04:14 | 48 | Normal | (None) | (None) |
| 0:06:28 | 134 | Abnormal | Normal | This model has optional items, so there are additional steps, which are within a reasonable period |

Each row in Table 1 represents a candidate event. Each candidate event includes a start time (event time), a candidate cycle time and an AI label. The above information is generated by the cycle time detection model. For example, the event time is inferred by AI, then the cycle time is estimated by calculating the time difference between two consecutive events, and finally the cycle time is compared with the normal region to determine the AI label. The candidate event located within the normal region is a normal event, and the candidate event located outside the normal region is abnormal events. The normal region includes the aforementioned upper bound and lower bound, which can be set by the user through the input device 30 during the report generation stage or the data exchange stage. For example, the upper bound may be set to 100 seconds, and the lower bound may be set to 30 seconds, and the corresponding diagram is shown in FIG. 4. The revision label and description are filled in by the user. For example, in the example shown in Table 1, the user corrects the abnormal event with the event time of 0:06:28 and the cycle time of 134 seconds as a normal event.

In an embodiment, if an abnormal periodic event is detected, the computing device 50 further sends out an alarm signal to notify the user. In addition, the computing device 50 fine tunes the cycle time detection model by collecting revision labels from user feedback, so that the AI can simulate human decision and continuously update and evolve to be close to the current scenario.

In step S7, the computing device 50 tunes a hyper-parameter of the cycle time detection model according to the revision label. Step S7 belongs to the aforementioned stage of hyper-parameter tuning. Hyper-parameters are common requirements for AI algorithms. Different hyper-parameters adapt different scenarios or data, so choosing appropriate hyper-parameters may improve the performance of the algorithm. The system 100 for detecting and correcting cycle time proposed by the present disclosure will automatically fine tune the hyper-parameters according to the user's input in the third stage of "report generation", and continue to make corrections. In an embodiment, the hyper-parameters that can be modified include an event threshold and a normal region (including the upper bound and the lower bound). Furthermore, the event threshold may be used to filter events with too low peak prominence, thereby achieving the effect of removing noise. However, the peak prominence is not easy to correspond to the concept of real life, so it is not easy for users to adjust manually. At this time, it is a better way to automatically fine tune by the system.

The event threshold is used to find events. The AI model finds candidate events from the video by finding peaks of the smooth signal. The computing device 50 fine tunes the event threshold by updating the event threshold to the lowest peak prominence in historical data.

The normal regions are used to classify events. The computing device 50 labels the events lie between the lower bound and upper bound as normal events and labels the other events as abnormal events. Therefore, the computing device 50 fine tunes the normal regions by moving the bounds to include the revised events.

In view of the above, the present disclosure proposes an automatic cycle detection and correction system and method based on videos, which has advantages including automation, flexibility, and continuously tuning. First, video streaming data is used for periodic image detection. The detected cycles are then tagged as normal or abnormal, and the user is notified with either instant alert or regular report. Furthermore, a feedback loop is designed in case false alarms detected. Users have the flexibility to rectify the results reasoning with certain description, and feedback as modified labelling to fine tune the system inference model to simulate human decision. The system and method proposed by the present disclosure has the following three advantages:

First, automation. The system proposed by the present disclosure automatically identifies cycles based on videos without human interference. Hence, it mitigates the opportunity cost of counting manually by the worker. Moreover, the system proposed by the present disclosure operates in the background and workers just work as usual. Therefore, the observer bias in manual measurement does not occur.

Second, flexibility. Recall that a sensor detects only specific events. In contrast, since videos contain a lot of information about cycles, the system proposed by the present disclosure is applicable for many kinds of stations. More precisely, the system applies to all stations with accessible cameras.

Third, continuously tuning. The system proposed by the present disclosure provides an interface for users to revise the anomaly detection results in. The interface can be used for not only report generating but also fine tuning the artificial intelligence (AI) algorithm inside the system. For examples, fine tuning the neural network or tuning the hyper-parameters of the algorithm. The revision label can be viewed as labeled data in machine learning and can be used in model training. With the labeled data, one can fine tune the neural network to adapt the current data. Moreover, the labeled data can be also used to tune the hyper-parameters of the algorithm; i.e., reduce the error rate or false positive rate by tuning the hyper-parameters. By continuously tuning, the system proposed by the present may simulate human decision.

What is claimed is:

1. A method for detecting and correcting cycle time, performed by a computing device, comprising:
    obtaining a video from a camera;
    obtaining a bounding box from an input device and inputting the bounding box and the video to a cycle time detection model to generate a preliminary report, wherein the bounding box is used to set a region of interest in the video, the preliminary report comprises a plurality of candidate events, and each of the plurality of candidate events includes a start time and a candidate cycle time;
    receiving a revision label associated with at least one of the plurality of candidate events from the input device; and
    tuning a hyper-parameter of the cycle time detection model according to the revision label;
    wherein obtaining the bounding box from the input device and inputting the bounding box and the video to the cycle time detection model to generate the preliminary report comprises:
    cropping the video according to the bounding box;
    inputting a plurality of frames of the video to a neural network model to generate a plurality of feature vectors;
    performing a principal component analysis on the plurality of feature vectors to reduce a dimension of the plurality of feature vectors and generate a plurality of low-dimension signals;
    performing a short time Fourier transform according to the plurality of low-dimension signals to generate a plurality of smooth signals; and identifying a periodic event according to a plurality of peak values of the plurality of smooth signals to obtain the plurality of candidate events.

2. The method for detecting and correcting cycle time of claim 1, further comprising:
receiving an upper bound and a lower bound from the input device; and
before identifying the periodic event according to the plurality of peak values of the plurality of smooth signals to obtain the plurality of candidate events, filtering the plurality of peak values according to a normal event range covered by the upper bound and the lower bound.

3. The method for detecting and correcting cycle time of claim 1, further comprising:
receiving a period hint from the input device; and
before performing the short time Fourier transform according to the plurality of low-dimension signals to generate the plurality of smooth signals, setting a sliding window size of the short time Fourier transform according to the period hint.

4. The method for detecting and correcting cycle time of claim 2, wherein
each of the plurality of candidate events further comprises an event label, the event label is used to indicate whether each of the plurality of candidate events belongs to a normal event or an abnormal event;
the revision label is used to modify the candidate event belonging to the normal event into the abnormal event or modify the candidate event belonging to the abnormal event into the normal event; and
tuning the hyper-parameter of the cycle time detection model according to the revision label comprises: tuning a value setting of the upper bound and the lower bound according to the revision label.

5. The method for detecting and correcting cycle time of claim 3, wherein tuning the hyper-parameter of the cycle time detection model according to the revision label comprises:
tuning a value setting of the period hint according to the revision label.

6. A system for detecting and correcting cycle time comprising:
a camera capturing an environment to generate a video;
an input device receiving a bounding box and a revision label, wherein the bounding box is used to set a region of interest in the video; and
a computing device communicably connecting to the camera and the input device, wherein the computing device is configured to input the bounding box and the video to a cycle time detection model to generate a preliminary report, the preliminary report comprises a plurality of candidate events, each of the plurality of candidate events includes a start time and a candidate cycle time, the computing device is further configured to tune a hyper-parameter of the cycle time detection model according to the revision label, wherein the revision label is associated with at least one of the plurality of candidate events;
wherein the computing device is further configured to:
crop the video according to the bounding box;
input a plurality of frames of the video to a neural network model to generate a plurality of feature vectors;
perform a principal component analysis to reduce a dimension of the plurality of feature vectors and generate a plurality of low-dimension signals;
perform a short time Fourier transform according to the plurality of low-dimension signals to generate a plurality of smooth signals; and
identify a periodic event according to a plurality of peak values of the plurality of smooth signals to obtain the plurality of candidate events.

7. The system for detecting and correcting cycle time of claim 6, wherein the input device is further configured to receive an upper bound and a lower bound, and the computing device is further configured to filter the plurality of peak values according to a normal event range covered by the upper bound and the lower bound.

8. The system for detecting and correcting cycle time of claim 7, wherein the input device is further configured to receive a period hint, and the computing device further sets a sliding window size of the short time Fourier transform according to the period hint.

\* \* \* \* \*